United States Patent
Shuster

(10) Patent No.: US 7,051,362 B2
(45) Date of Patent: May 23, 2006

(54) METHOD AND SYSTEM FOR OPERATING A NETWORK SERVER TO DISCOURAGE INAPPROPRIATE USE

(75) Inventor: Gary Stephen Shuster, Fresno, CA (US)

(73) Assignee: Ideaflood, Inc., Zephyr Cove, NV (US)

( * ) Notice: Subject to any disclaimer, the term of this patent is extended or adjusted under 35 U.S.C. 154(b) by 561 days.

(21) Appl. No.: 09/859,948

(22) Filed: May 16, 2001

(65) Prior Publication Data

US 2002/0083070 A1    Jun. 27, 2002

Related U.S. Application Data

(60) Provisional application No. 60/204,994, filed on May 16, 2000.

(51) Int. Cl.
- *G06F 17/30* (2006.01)
- *G06F 7/04* (2006.01)
- *G06K 9/00* (2006.01)
- *H04L 9/32* (2006.01)

(52) U.S. Cl. .................. 726/2; 726/26; 726/3; 726/12; 709/219; 709/229

(58) Field of Classification Search .............. 713/193, 713/160, 161, 166, 165, 200, 201; 726/2, 726/26; 709/219, 229
See application file for complete search history.

(56) References Cited

U.S. PATENT DOCUMENTS 6,198,850 B1 *  3/2001  Banton ........................ 382/239
6,209,096 B1 *  3/2001  Taruguchi ................... 713/193
6,493,744 B1 * 12/2002  Emens et al. ............... 709/203
6,591,367 B1 *  7/2003  Kobata et al. .............. 713/201
6,704,872 B1 *  3/2004  Okada ......................... 713/194

FOREIGN PATENT DOCUMENTS

WO    WO 9825373 A2 *  6/1998

* cited by examiner

Primary Examiner—Gilberto Barron, Jr.
Assistant Examiner—Samson Lemma
(74) Attorney, Agent, or Firm—Connolly, Bove, Lodge & Hutz LLP

(57) ABSTRACT

A method and system for operating a network server to discourage inappropriate use are disclosed. The method provides for altering files on the server in such a way so as essentially not affect acceptable, desired file types in any noticeable way, and to substantially corrupt undesirable file types. The method may be applied to every file copied to or from a memory of the server. In the alternative, the method may be applied only to selected files or types of files on the server. In particular, the files corrupted by altering according to the invention are executable software files and compressed files, that are generally not fault-tolerant. Fault tolerant files, such as uncompressed text and graphics files in common Internet-compatible formats, are not noticeably affected. The network server will therefore no longer be useful for storing or transferring undesirable files, and such use will be discouraged. According to a related embodiment of the invention, a system comprises a server having an application that performs one of the embodiments of the method according to the invention.

20 Claims, 2 Drawing Sheets

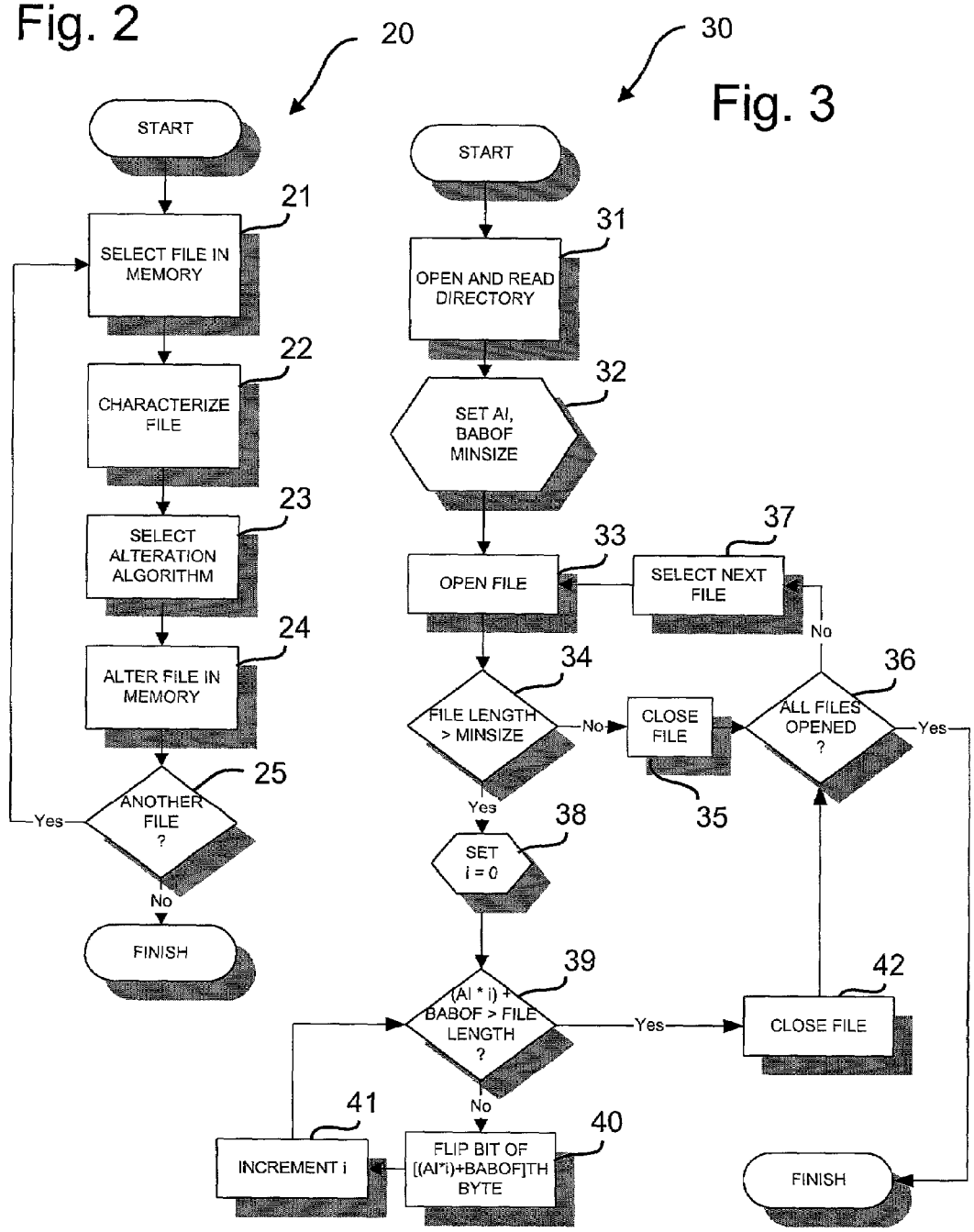

METHOD AND SYSTEM FOR OPERATING A NETWORK SERVER TO DISCOURAGE INAPPROPRIATE USE

CROSS-REFERENCE TO RELATED APPLICATION

This application claims priority pursuant to 35 U.S.C. § 119(e) to U.S. Provisional Application No. 60/204,994, filed May 16, 2000, which application is specifically incorporated herein, in its entirety, by reference.

BACKGROUND OF THE INVENTION

1. Field of the Invention

The present invention relates to methods and systems for operating a server connected to a wide area network, such as the Internet, and particularly to a method and system for receiving, serving, and storing files in response to requests from users, whereby inappropriate use of the server, such as illegal copying and distribution of copyrighted content, may be selectively discouraged.

2. Description of Related Art

Publicly accessible servers, in particular servers that provide storage space for no charge, such as servers on free web hosts, are often used inappropriately in violation of agreed terms of service and copyright laws for the distribution of copyrighted files such as software, music, image and video files. Such file types often consist of or contain illegally copied content. The illegally copied content may lend an undesirable taint to operators of web hosting services who do not wish to be perceived as encouraging, condoning, or participating in copyright violations. Additionally, the storage and exchange of these illegal or otherwise inappropriate files consumes bandwidth and other resources needed for more appropriate uses, thereby choking and discouraging the uses that the web server is intended to serve. Another injury that may be caused by inappropriate or illegal copying is disproportionately heavy use of the server by relatively few users, thereby reducing performance for all users, and reducing the number of subscribers that the hosting service attracts. A related problem is the devaluation of advertising space as a result of people downloading such files, and the potential for alienating advertisers who have purchased advertising space on the servers that are being used inappropriately.

Therefore, a method and system is needed to discourage inappropriate use of publicly available, network-connected server space, without adversely affecting intended uses of the server space or restricting public access. The method and system should integrate seamlessly and cost-effectively with existing network protocols and server software and hardware,

SUMMARY OF THE INVENTION

A method and system for operating a network server are provided, whereby files on the server are altered in such a way so as to essentially not affect appropriate, desired file types in any noticeable way, and to corrupt inappropriate, undesirable file types. As used herein, to "corrupt" a file means to alter it so that it becomes substantially unusable for its intended application. For example, a corrupted executable file cannot be executed without generating a fatal error or otherwise failing to operate in the intended manner; music in a corrupted music file cannot be played; and files within a compressed multi-part file cannot be extracted and/or used.

The method may be applied to every file copied to or from a memory of the server. In the alternative, the method may be applied only to selected files or types of files on the server. In particular, the files corrupted by altering according to the invention may be executable software files and compressed files that are generally not fault-tolerant. Fault tolerant files, such as uncompressed text and graphics files in common Internet-compatible formats, are not noticeably affected. Consequently, the invention is particularly useful for operating a server wherein the desired or acceptable file types are fault-tolerant, and the undesired file types are generally not fault-tolerant. The destructive alteration of undesirable file types may be made difficult or impossible to reverse by anyone lacking knowledge of the corruption scheme. The network server will therefore no longer be useful for storing or transferring undesirable files, and such use will be discouraged. System bandwidth is thereby conserved, and the response of the server to appropriate uses can be greatly improved. Furthermore, the method can be implemented in a variety of different systems without consuming significant system resources.

According to an embodiment of the invention, the server is connected through a network, such as the Internet, to a plurality of client devices, and is configured to transfer information between any selected one of the client devices and a memory for static storage of information. The method comprises the steps of selecting a file residing in a memory of the server for alteration by applying predetermined screening rules, and altering a relatively small discrete portion of the identified file according to an algorithm comprising a set of predetermined alteration rules. The predetermined alteration rules are such that the information value and functionality of fault-tolerant files is essentially unchanged, while fault-intolerant files are essentially rendered unusable. The amount of data altered in the file may be as small as a single bit. The alteration step may be performed as files are served from the server or as they are transferred to the server. In the alternative, the alteration step may be performed while the files are stored in a static server memory, such as by using a disk crawling method.

Preferably, the alteration rules provide for placing any altered bits towards the end of the file, where they are least likely to affect appropriate file types, for example, HTML and graphics files. The location for placing altered bits may be selected at random, so that the altered file cannot be repaired. In the alternative, a complex quasi-random algorithm may be used to select the location of the altered bits, so that the file can only be repaired by someone who knows the algorithm. A quasi-random algorithm has the added benefit of making difficult the detection of the precise algorithm used via a comparison of various files pre- and post-alteration. The alteration may be made "invisible"—i.e., inconsequential—to appropriate file types, by determining the manner in which the alteration is made based on a putative file type. For example, a harmless comment, such as "<!>" may be inserted into a file with a ".htm" extension (signifying an HTML formatted file). Insertion of inconsequential information based on putative file type is particularly effective in discouraging deceptive naming practices, whereby undesired file types are disguised by assigning a name signifying a desired type of file to an undesired file. Traceable information may be inserted into the files during alteration, to facilitate tracking future copying of the file. Similarly, files may be "flagged" so that they are not inadvertently altered more than once. In an embodiment of the invention, selected types of bytes, such as non-text characters, are deleted or altered, to discourage disguising undesirable file types as acceptable file types, such as ".txt" or ".htm" files. These and other alteration rules may be used and combined in various ways in an alteration method according to the invention.

According to a related embodiment of the invention, a system comprises a server having an application that performs one of the embodiments of the method according to the invention. A more complete understanding of the method and system for operating a network server to discourage inappropriate use will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 is a flow diagram showing exemplary steps for performing a method according to the invention in general.

FIG. 3 is a flow diagram showing exemplary steps for performing an alteration algorithm according to an exemplary embodiment of the invention.

DETAILED DESCRIPTION OF THE PREFERRED EMBODIMENT

Figure 1:
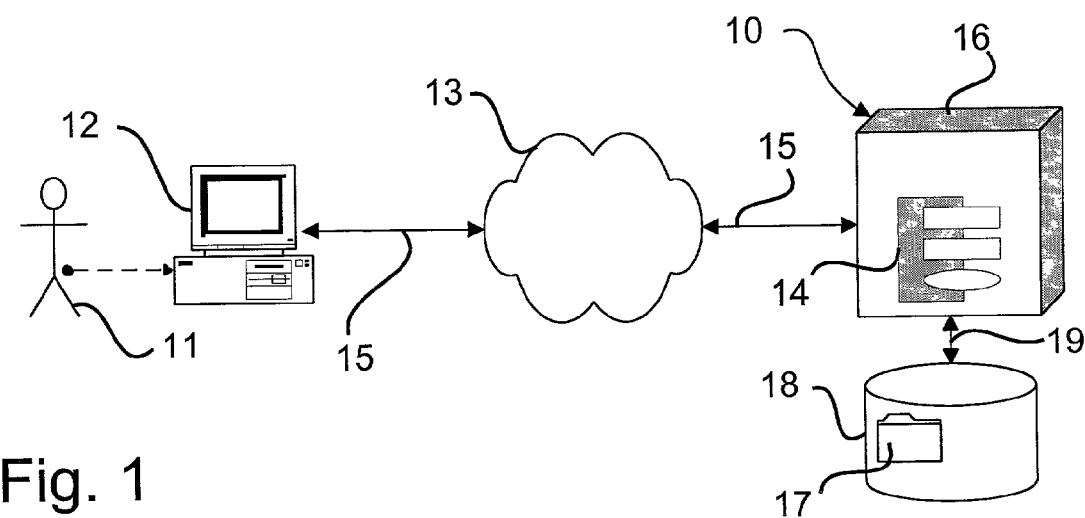
FIG. 1 is a system diagram showing an exemplary system for implementing a method according to the invention, and its relationship to other elements.

The present invention provides a method and system operable at an application or higher network level for discouraging inappropriate use of network resources. In the detailed description that follows, like element numerals are used to describe like elements shown in one or more of the figures.

Referring to FIG. 1, system 10 comprises a server 16 and an application 14 executing on the server. Server 16 is typically a general purpose computer configured for serving information to multiple users across a network, but may comprise any high-level computing device capable of performing the method described herein. Application 14 comprises a program of instructions for performing the method described herein, and may additionally comprise instructions for performing other server functions as known in the art.

Server 16 is connected to network 13 by communication link 15 and to a memory 18 containing at least one file 17. Memory 18 is any device, such as a hard drive or array of hard drives, tape drive, optical disk drive, or similar device, for static storage of information; and particularly, devices capable of accessing and storing massive amounts of high-level data for indefinite periods. In an embodiment of the invention, memory 18 is physically adjacent to server 16 and connected to the server through a server-operated bus 19. Server 10 controls access by users, such as user 11 connected to network 13, to memory 18. File 17 is a set of high-level data encoded in a finite number of discrete information bits, such as binary bits. A plurality of files such as file 17 are used to exchange high-level information between a plurality of users, such as user 11, connected to network 13 using client devices such as terminal 12 and a communication link 15. Network 13 may be a wide area network, such as the Internet, a local area network, or a combination of different types of networks. The network may be operated by various protocols, such as TCP/IP. The system and method according to the invention are not limited to application with any particular type of network, protocol, or client device.

Referring to FIG. 2, exemplary general steps of a method 20 for discouraging inappropriate use of memory connected to a network are shown. An initial step of method 20 is the selection at step 21 of a file in the server memory for alteration. In an embodiment of the invention, alteration is applied to all public files stored, or to be stored, in the server's static memory storage. Generally, the method may be effectively applied to all files received from public sources for storage on the server. That is, files may be selected without determining whether the file is an inappropriate type of file or an appropriate type of file. Of course, files received from trusted sources, such as files created by a network administrator, are preferably not subjected to alteration.

In the alternative to applying the method to all files in the server's public storage areas, the method may be applied to files of a selected type, such as ".mp3" files. However, file types may generally be disguised, so the latter embodiment may suffer from the disadvantage of being easily circumvented. Furthermore, if the file type can indeed be reliably and quickly determined, it may be simpler and more effective to simply delete or refuse to transfer the offending file. However, method 20 provides advantages relative to a method based on a "detect and destroy" strategy, when it is not feasible to automatically determine with certainty that an unknown file is actually inappropriate. The advantages of method 20 may accrue whether or not it is feasible to automatically identify files that are suspected of being inappropriate. When suspected files may be identified, the public files may be screened or filtered in various ways to identify them as candidates for alteration according to method 20. For example, only files greater than a predetermined size, such as ten kilobytes or one-hundred kilobytes, may be subject to alteration. For further example, a portion or all of each file may be analyzed to identify patterns typical of particular file types, and only files displaying patterns typical of inappropriate file types may be selected for alteration. In the alternative, files that display patterns typical of appropriate file types may be spared alteration. Of course, files that are self-identified as being of an offending type, for example ".mp3" files, may simply be deleted.

It may be further advantageous to avoid altering any particular file more than once. In some embodiments, the alteration algorithm will reverse a particular bit or bits of the file. Employing the same algorithm again may restore the file to its original state, which is generally not desirable (although reversibility may be advantageous when restoration of an altered file is specifically sought). In other embodiments, the original file may not be restored when the alteration algorithm is employed a second time; however, repeated alteration may cause appropriate file types to become corrupted or noticeably degraded. Repeated alteration of the same file may be avoided by marking the file with a flag indicating that the file has been altered. Files marked with the flag are then excluded from further alteration. The flag may reside in the file itself. For example, an unusual bit pattern may be placed at a specified location in the file. In the alternative, the flag may be associated with the file elsewhere in the storage system. For example, the file attributes may be changed, or the file may be moved to a "read-only" directory containing only public files.

Whether or not applied to all public files in the server's static storage, or to a subset of public files, method 20 may then be triggered by various events. For example, the receipt of a public request for a file transfer may trigger performance of method 20 upon the requested file. If more than one file is requested, each file requested for transfer may be selected in turn. As used herein, "transfer" includes both the transmission of a file from a public memory to a client device, and storage in the public memory of a file received from a client device. Method 20 may be triggered by both types of transfers, but may operate more efficiently if operated upon files when received, before the files are placed in static storage. According to this embodiment, the files will be stored in an altered state. If efficiency is not a primary concern, it may, in the alternative, be advantageous to alter files only as they are served in response to a request. Altering files upon request may require repeated processing of the same file (that is, of files that are requested repeatedly), but can provide the advantage of preserving an unaltered copy of every file in the server's storage. In the alternative, both an unaltered copy and an altered copy of every file may be stored, with only the altered copy available for public use. In another alternative embodiment, any unaltered files in the server's public storage area are periodically identified and altered, with or without preserving an unaltered copy. For example, at periodic intervals, a "disk-crawling" program may be executed on the server, where the disk-crawling program will alter all (or a selected portion of) files stored in the server's static memory at any particular time.

At optional step 22, the selected file may be characterized, that is, tentatively identified as being of a particular file type. Characterization may be performed as part of a selection step, or may be performed after a file is selected. In either case, the process of characterization will be the same or similar. Selected attributes and/or contents of the file are read and characteristic data patterns are recognized. The data patterns and file attributes are compared against a database of attributes and patterns as related to file types, from which a suspected file type is identified. Step 22 provides the advantage of facilitating selection of more targeted alteration algorithms having a higher probability of corrupting inappropriate file types while not adversely affecting appropriate file types. However, performance of step 22 may consume substantial resources and may require a higher initial investment in programming. Accordingly, for simpler, low-cost implementation, step 22 may be omitted.

One likely use for file characterization is detection of compressed files. Many inappropriate files comprise a plurality of files compressed into a single file. The characterization step may detect such compressed files, and also may identify the location of the individual files within the compressed file. Each individual file in the compressed file may then be targeted for alteration. Of course, if it may be determined with certainty that a compressed file is of an inappropriate type, the compressed file may simply be deleted. However, on some server systems compressed files may comprise both appropriate and inappropriate file types.

At step 23, an alteration algorithm is selected. A single alteration algorithm may be applied to every file selected for alteration. In the alternative, an algorithm may be selected from a library of alternative algorithms, depending on factors such as the suspected file type. Effective operation of method 20 essentially depends on selection of an appropriate alteration algorithm. At the same time, various alternative rules may be equally or comparably effective in selectively corrupting only inappropriate file types. Therefore, the rules described herein are merely exemplary in nature, and are not intended to limit the scope of the invention.

Alteration algorithms in general comprise a set of rules and/or a sequence of steps for selecting one or more binary bits of a file. Binary bits, of course, have only two possible states, so once the appropriate bits have been selected, alteration at step 24 is performed by merely reversing their state, that is, by changing a zero (0) bit to one (1), and vice-versa. Bit reversal may be accomplished, for example, by performing an exclusive OR operation on a selected byte of the file and an alteration byte. For more specific example, in an eight-bit byte environment, an exclusive OR with the byte "00000001" will reverse the lowest-value bit of any comparison byte. Optionally, the altered file may be stored in the servers static storage, with or without retaining a copy of the unaltered file. After the desired bits have been altered, method 20 may be repeated for the next file, as indicated at step 25.

In an Internet (TCP/IP) environment, it is preferable to select the bits to be altered occurring a specified number of bytes, for example, ten kilobytes, after the first byte of the file. Many file formats are less fault-tolerant near the beginning of the file. In addition, it may be desirable to ensure that the checksum for the early part of the file is not changed. Files smaller than the specified number, e.g., less than ten kilobytes, may be excluded from being altered. In a related embodiment, the alteration bit or bits are selected in proximity to the end of the file, such as within ten kilobytes of the end of the file.

To prevent circumvention and/or reversibility of the alteration, the alteration algorithm may provide for selecting an alteration bit or bits at random from the file to be altered. For example, a random number generator may be used to select a byte between ten and a thousand kilobytes. The random selection may then be repeated to alter as many bits as desired. Technically, most software-driven random number generators do not actually produce random numbers, because the pattern of numbers produced will typically depend on a beginning seed number of some kind. However, any given number produced by such generators using a secret, independently derived seed can be kept secret, i.e., cannot be determined in a second operation by an independent party. For the purposes of the present invention, maintaining secrecy of the seed number will ordinarily be sufficient to ensure an unpredictable, seemingly random result when operating on the same file. This randomness and unpredictability should be sufficient to prevent circumvention of the alteration, and actual randomness should not be required. Should a truly random number be desired, however, hardware devices for generating such numbers are available. It should be noted in addition, that as a practical matter, the number produced by a typical software-driven random number generator may not be predicted or determined even by a system operator in possession of the seed number. Therefore, an alteration based on such a generator may be practically irreversible even by the system operator.

To make circumvention more difficult without destroying reversibility, a quasi-random generator may be used for bit selection. A quasi-random generator appears to generate a random number, but actually, it does not. Instead, it operates in a reversible way on selected information in or associated with the file to produce a variable number. The same variable number will be produced if the quasi-random operation is performed again with the same input values. It may therefore be desirable for the input variables to include a variable number that is only available to the system operator, as well as a variable number derived from information in the file that is altered. For example, the quasi-random generator may count the number of 1's (i.e., bits having a value of 1) occurring in the first ten kilobytes of the file, add a secret number from a look-up table of random numbers based on the day and time of alteration, raise the sum of the counted and secret numbers to the 5/3 power, and multiply by pi. The number generated is, of course, not random. However, it would be difficult for a party ignorant of the formula to determine how the number had been generated and thereby generally circumvent the alteration scheme, without possessing the formula employed. The secret independent input variable, if used, additionally makes circumvention difficult in the case of a particular file, because the bits that may be altered during future processing of a file cannot be determined by comparing a previously altered file to an unaltered file. That is, different bits will be altered each time the file is processed using the method. Meanwhile, the quasi-random number may be easily determined by one in possession of the secret formula and look-up table. Actual formulas may be considerably more complex than the simple example provided, without departing from the scope of the invention.

In an embodiment of the invention, the alteration algorithm determines the method of making an alteration based on a putative file type determined, for example, by the file name extension, file header, or other information associated with a file that purports to identify the file type. The selected alteration is invisible, that is, inconsequential, to the file of the purported type. One way to accomplish an inconsequential alteration is to insert surplus or altered information in a format that will be essentially ignored when present in files of the purported type. For example, a comment "<!>" may be inserted within a purported HTML file, such as a file named with an ".htm" extension. In the alternative, any character contained within an existing comment field of a file type supporting delimited comment fields, such as an HTML file, may be changed, for example, a space may be changed to a dash within a comment. Such changes will have no effect whatever on the display or other use of the file, and only an inconsequential impact on the raw information content of the file. However, if a purported file with delimited comments is actually some other type of file, for example, an executable binary-coded file, the change will likely effectively corrupt the file.

In a related embodiment using alteration based on putative file type, the alteration algorithm identifies a byte of the file for which a byte synonym exists in the codes of the appropriate file types. A byte synonym is a byte having a different value that is interpreted in the same way, or in a substantially very similar way, as the original byte, when in a file of an appropriate type. For example, a common graphics file format may display the hexadecimal string "AE" in a similar manner to the string "AF," such as displaying a pixel having a color of a slightly different shade. The alteration step 24 then comprises substituting at least one of the identified bytes with a byte synonym, for example, exchanging "AE" for "AF." This is unlikely to noticeably affect the files of the desired type, but will effectively corrupt other file types such as binary coded files.

A related approach that may be embodied in an alteration algorithm is to identify bytes that are not likely to be present in files of desired, appropriate types, and altering or deleting those bytes. For example, many common, appropriate file types primarily comprise coded text, for example ASCII-coded text characters. Selected or all non-text characters in the file may be deleted or altered, such as, for example, by changing non-text characters to the ASCII space (blank) character. Text files are thus likely to be essentially unaffected by the alteration, while other file types may be corrupted. Similar algorithms may be employed with other (non-ASCII or non-text) coding schemes. It may be particularly preferable to select a byte-type specific algorithm based on the indicated file type. For example, if the file is named with a "txt" extension, then selection of a text-specific algorithm may be preferred. If the file is named with some other extension, for example, a "gif" extension, then a different algorithm may be employed.

According to another embodiment of the invention, the alteration algorithm comprises a step of inserting traceable identifying information into a file of an inappropriate type. The identifying information may comprise any bit pattern that is not present in the unaltered file and that is sufficiently distinctive to uniquely identify the file. At the same time, the bit pattern should not cause corruption of appropriate file types. Preferably, the identifying information will not be readily recognized as such by those not in possession of the identifying algorithm. For example, a particular pattern of bits may be distributed at specified, secret and/or random locations in the file. The location of the identifying bits may be recorded in a separate database, or otherwise determinable with the use of a secret formula or secret data, for use in subsequent law enforcement efforts.

Elements of the foregoing alteration algorithms may be combined in various ways without departing from the scope of the invention. For example, it may be preferable to combine algorithms which select bytes towards the end of a file with random or quasi-random bit selection and substitution of selected non-text characters. One skilled in the art may devise various other suitable combinations.

Referring to FIG. 3, exemplary steps comprising an alteration algorithm 30 of a method according to an embodiment of the invention are diagrammed. Algorithm 30 is especially suitable for implementation as a periodically executed disk-crawling application of general applicability to various file types. It is designed to corrupt binary-coded files and compressed files, while creating only relatively minor alterations in text files and most graphics files. At a designated time, the directory containing the public files to be altered is opened and the directory contents are read at step 31. Preferably, the directory containing the files to be processed is designated as a temporary holding area and only contains files that have not yet been processed.

At step 32, the alteration variables are initialized. In the exemplary algorithm 30, the variables comprise an alteration interval ("AI"), expressed as an integer number of bytes, such as 750 kilobytes; a number of bytes after the beginning of the file ("BABOF"), such as ten kilobytes, before which no alteration is to occur; and a designated minimum file size ("MINSIZE"), such as ten kilobytes. In algorithm 30, these variables are held constant during the disk-crawling procedure, however, they may vary depending on parameters such as file size, if desired.

At step 33, a file in the directory is opened. At step 34, the number of bytes in the file are counted and compared to the MINSIZE variable. If the number of bytes in the file is equal or less than MINSIZE, the file is not altered, and the file is then closed and saved at step 35, preferably in a different directory. The termination condition is then checked at step 36, and if files remain to be processed, the next file is selected at step 37, repeating the cycle beginning at step 33.

If the number of bytes in the file is greater than MINSIZE, a counter variable ("i") is reset to zero at step 38. Then, a product of AI and I, plus BABOF, is computed at step 39. This computed number is the location of the byte to be altered in the current execution cycle, and is compared to the file length at step 39. To prevent termination of the alteration loop in the first cycle (i.e., when i=0 and the byte location therefore equals BABOF), the MINSIZE variable is preferably greater than or equal to the BABOF variable. Thus, if in the initial cycle the file length is greater than or equal to BABOF (and in subsequent cycles, if the file length is greater than or equal to BABOF plus each subsequent interval AI cumulative with prior AI intervals), then a selected bit of the selected byte is flipped at step 40. For example, the lowest-value bit of the byte may be flipped. At step 41, the counter variable i is incremented, such as by 1. The cycle of steps 39–41 are repeated until the end of the file is indicated at step 39. The altered file is then closed and saved, preferably in a different file directory. The termination condition is then checked at step 36, the next file selected at step 37, and the cycle repeated beginning at step 33.

The cycle of steps 33–42 are repeated until all files in the directory have been processed. After all files have been processed, the termination condition is satisfied and the process terminates at step 36. One skilled in the art may program an application for performing the steps of algorithm 30 in various ways.

Having thus described a preferred embodiment of a method and system for operating a network server to discourage inappropriate use, it should be apparent to those skilled in the art that certain advantages of the within system have been achieved. It should also be appreciated that various modifications, adaptations, and alternative embodiments thereof may be made within the scope and spirit of the present invention. For example, exemplary alteration algorithms have been described, but it should be apparent that the inventive concepts described above would be equally applicable to other alteration algorithms. The invention is further defined by the following claims.

What is claimed is:

1. A method for operating a network server to discourage inappropriate use of server memory, wherein the server is connected to a plurality of public clients and is operable to transfer public files between a memory of the server and selected ones of the plurality of clients, wherein the public files comprise files of a fault-tolerant type for which storage in the memory is to be encouraged, and files of a fault-intolerant type for which storage in the memory is to be discouraged, the method comprising the steps of:

selecting a file from the public files;

selecting a first portion of the file, the first portion comprising at least one bit of information in the file and being smaller than the file;

rendering the file unusable for its intended purpose by altering said first portion to create an altered file and leaving a second portion of the file unaltered if the file is a fault-intolerant type; and preserving the usability of the file for its intended purpose even while remaining altered if the file is a fault-tolerant type.

2. The method of claim 1, further comprising storing the altered file in the memory.

3. The method of claim 1, further comprising storing both the file and the altered file in the memory.

4. The method of claim 1, further comprising serving the altered file in response to a request from one of the plurality of clients without providing sufficient information for reversing alterations made by the altering step.

5. The method of claim 1, further comprising marking the altered file with a flag indicating that the file has been altered.

6. The method of claim 1, further comprising inserting identifying information into the altered file.

7. The method of claim 1, wherein said first selecting step further comprises selecting the file without determining whether the file is a fault-tolerant type of file or a fault-intolerant type of file.

8. The method of claim 1, wherein said first selecting step further comprises selecting the file from files having more than a specified number of bytes.

9. The method of claim 1, wherein said first selecting step further comprises selecting the file after reading at least a portion of the file and thereby determining that the file is likely to be of the fault-intolerant type.

10. The method of claim 1, wherein said first selecting step further comprises selecting the file after determining that the file is free of any flag indicating that the file has been altered.

11. The method of claim 1, wherein said first selecting step further comprises selecting the file comprised of a plurality of compressed files, and wherein said second selecting step further comprises selecting the first portion comprising at least one bit from each of the plurality of compressed files.

12. The method of claim 1, wherein said second selecting step further comprises selecting the first portion beginning a specified number of bytes after a first byte of the file.

13. The method of claim 1, wherein said second selecting step further comprises selecting the first portion beginning at least ten kilobytes after a first byte of the file.

14. The method of claim 1, wherein said second selecting step further comprises selecting the first portion at random from the file.

15. The method of claim 1, wherein said second selecting step further comprises selecting the first portion within a byte for which there is at least one byte synonym in the codes of the appropriate type of file, and wherein said altering step further comprises altering the at least one bit of information so that the byte is transformed into the at least one byte synonym.

16. The method of claim 1, wherein said second selecting step further comprises selecting the first portion within at least one non-text byte of the file.

17. A system to discourage inappropriate use of memory controlled by a server, wherein the server is operable to store public files in the memory, wherein the public files comprise files of a fault-tolerant type for which storage in the memory is to be encouraged, and files of a fault-intolerant type for which storage in the memory is to be discouraged, the system comprising:

a network server connected to a network;

a memory controlled by said network server; and an application in the memory, the application operable to execute on the network server to provide the functions of:

selecting a file from the public files;

selecting a first portion of the file, the first portion comprising at least one bit of information in the file and being smaller than the file;

rendering the file unusable for its intended purpose by altering said first portion to create an altered file and leaving a second portion of the file unaltered if the file is a fault-intolerant type; and preserving the usability of the file for its intended purpose even while remaining altered if the file is a fault-tolerant type.

18. The system of claim 17, wherein the application is further configured to perform the function of marking the altered file with a flag indicating that the file has been altered.

19. The system of claim 17, wherein the application is further configured to perform the function of inserting identifying information into the altered file.

20. The system of claim 17, wherein the second selecting function of said application further comprises selecting the first portion beginning a specified number of bytes after a first byte of the file.

* * * * *